Patented Jan. 2, 1940

2,185,297

UNITED STATES PATENT OFFICE

2,185,297

ORGANIC ESTERS AND METHOD FOR THEIR PRODUCTION

Walter E. Gloor, Parlin, N. J., assignor to Hercules Powder Company, Wilmington, Del., a corporation of Delaware No Drawing. Application September 23, 1936, Serial No. 102,163

11 Claims. (Cl. 260—488)

This invention relates to esters of aliphatic polyhydric nitro-alcohols with monobasic organic acids and to compositions in which such organic esters are present as an ingredient.

An object of this invention is the provision of a new group of chemical compounds which are of particular advantage as plasticizers for cellulose esters, as nitrocellulose, cellulose acetate, etc., cellulose ethers, chlorinated rubber, natural resins, etc.

A further object of this invention is to provide compositions of cellulose acetate plasticized with monobasic organic esters of aliphatic polyhydric nitro-alcohols which are particularly adapted for use as molding compositions.

The new esters in accordance with this invention are esters of an aliphatic polyhydric nitro-alcohol, and are characterized by containing somewhere in their structure an aliphatic —C—NO$_2$ group. This group of compounds is entirely distinct from the aliphatic nitrates which contain the group —C—O—NO$_2$, and from the aromatic nitro compounds which contain the —NO$_2$ group linked to a carbon atom in an aromatic ring.

The method in accordance with this invention consists of esterifying an aliphatic polyhydric nitro-alcohol with a monobasic organic acid or an anhydride of a monobasic organic anhydride. The aliphatic polyhydric nitro-alcohol which I may esterify is characterized by containing somewhere in its structure the —C—NO$_2$ group and two or more hydroxyl groups, and may be, for example, trimethylol nitromethane, dimethylol nitroethane, tri-alpha-ethylol nitromethane, dimethylol nitropropane, dimethylol nitrobutane, 1-1 dimethylol-1-nitro-4-hydroxy butane, etc.

The aliphatic polyhydric nitro-alcohols which I may esterify may be conveniently prepared by the condensation of an aldehyde with an aliphatic compound containing a nitro group, such as, for example, a nitro-hydrocarbon, a nitro-alcohol, etc. Thus, for example, dimethylol nitro ethane may be prepared by the alkaline condensation of formaldehyde with nitroethane. Triethylol nitromethane may be similarly prepared by the condensation of acetaldehyde with nitromethane. Similar aliphatic polyhydric nitro-alcohols may, for example, be prepared by the condensation of formaldehyde with 1-nitropropane, 2-nitropropane, 1 nitro-2-methyl propane, etc.

The monobasic organic acid which I may use to esterify the aliphatic polyhydric nitro-alcohol may be any monobasic organic acid which is sufficiently reactive to undergo an esterification reaction at a temperature below that at which the aliphatic polyhydric nitro-alcohol is rapidly decomposed, such as, for example, the lower fatty acids, as, acetic acid, propionic acid, butyric acid, aromatic acids, as benzoic acid, toluic acid, etc. The temperature at which the rate of decomposition of an aliphatic polyhydric nitro-alcohol decomposes depends upon the particular alcohol and upon the conditions of reaction. It will, however, be found that the rate of decomposition of an aliphatic polyhydric nitro-alcohol in an esterification medium does not become rapid at a temperature below 210° C.

The anhydride of a monobasic organic acid which I may use to esterify the aliphatic polyhydric nitro-alcohol may be an anhydride of any monobasic organic acid, which is sufficiently reactive to undergo an esterification reaction at a temperature below that at which the aliphatic polyhydric nitro-alcohol is rapidly decomposed, such as, for example, the anhydrides of acetic acid, propionic acid, butyric acid, benzoic acid, toluic acid, etc.

The esterification reaction, in accordance with this invention, will desirably be carried out at a temperature below 210° C., and preferably within the range of about 100° C. to about 150° C. The reaction will preferably be carried out in the presence of an esterification catalyst, such as, for example, zinc chloride, p-toluene sulfonic acid, benzene sulfonic acid, xylol sulfonic acid, sulfuric acid, pyridine, etc.

In the esterification reaction, in accordance with this invention, the removal of the water produced in the reaction is facilitated by carrying out the reaction under reflux in the presence of an azeotrope such as toluene, separating water from the condensate, and returning the azeotrope to the reaction. Alternately, the anhydride of the acid of which the ester is desired, is reacted with the aliphatic polyhydric nitro-alcohol in the presence of pyridine with or without one of the other esterification catalysts mentioned.

The following example further illustrates the method in accordance with this invention.

EXAMPLE I

PREPARATION OF DIMETHYLOL NITROETHANE DIACETATE

One mol (101 grams) of dimethylol nitroethane and 2.4 mols (144 grams) of glacial acetic acid were mixed with 75 grams of toluol and 2 grams of p-toluene sulfonic acid. This mixture was boiled beneath a reflux condenser provided with a graduated tube for separating the water given off by the reaction. The reaction was continued until 37 cc. of water had separated out in the moisture tube. The reaction mixture was then boiled under vacuum to remove the toluene and the unreacted acetic acid, after which the heat and vacuum were increased and the product, dimethylol nitroethane diacetate, is distilled over as a clear colorless oil.

EXAMPLE II
PREPARATION OF TRIMETHYLOL NITROMETHANE TRIPROPIONATE

One mol (151 parts by weight) of trimethylol nitromethane was refluxed for three hours with 7.2 mols (938 parts by weight) of propionic anhydride in the presence of one mol (79 parts by weight) of pyridine and 2.0 parts by weight of zinc chloride. This reaction mixture was then cooled, poured into ice water and allowed to stand until the unreacted propionic anhydride is decomposed. This mixture was then extracted with ether, the ether extract neutralized, dried, and the ether evaporated. The product is then obtained in purified form by vacuum distillation, and is trimethylol nitromethane tripropionate.

The chemical formulas and properties of representative products in accordance with this invention are given in the following table:

admixture with other plasticizers, as plasticizers in cellulose acetate plastics. These products give good colloiding and non-evaporating properties in plastics and will be found to be highly resistant to heat, light, and water, and to be good solvents for poorly miscible material, such as triphenyl phosphate.

The following table illustrates compositions, made in accordance with this invention, which are suitable for use as molding plastics.

Table II

| Example No. | 1 | 2 | 3 | 4 | 5 | 6 | 7 | 8 |
|---|---|---|---|---|---|---|---|---|
| Cellulose acetate (52% acetic acid) | 32 | 32 | 32 | 32 | 32 | 32 | 32 | 32 |
| Dimethylol nitroethane dipropionate | 12 | | | | | | | |
| Dimethylol nitropropane dipropionate | | 12 | | | | | | |
| Trimethylol nitromethane triacetate | | | 19 | 12 | | | | |
| Trimethylol nitromethane tripropionate | | | | | 10.2 | | | |
| Trimethylol nitromethane tributyrate | | | | | | 18 | 6 | |
| Dimethylol nitroethane diacetate | | | | | | | | 2 |
| Triethylol nitromethane diacetate | | | | | | | | 6 |
| Methyl phthalyl methylglycollate | | | | | | 6 | 12 | 5 |
| Triphenyl phosphate | 6 | 6 | | 6 | | | | 5 |

Table I

| Name | Formula | Density at 25° C. | R. I. at 20° C. | Boiling range at 5-10 mm. |
|---|---|---|---|---|
| Trimethylol nitromethane triacetate | $H_3COOC.CH_3$<br>$CH_3COOCH_2-C-NO_2$<br>$H_3COOC.CH_3$ | 1.239 | 1.4585 | °C.<br>160-170 |
| Trimethylol nitromethane tripropionate | $H_3COOC.CH_2.CH_3$<br>$CH_3.CH_2.COO.CH_2-C-NO_2$<br>$H_3COOC.CH_2.CH_3$ | 1.171 | 1.4480 | 170-185 |
| Trimethylol nitromethane tri-butyrate | $H_3COOC.CH_2.CH_2.CH_3$<br>$CH_3.CH_2.CH_2.COO.CH_2-C-NO_2$<br>$H_3COOC.CH_2.CH_2.CH_3$ | 1.115 | 1.4480 | 185-205 |
| Dimethylol nitroethane diacetate | $H_3C.OOC.CH_3$<br>$CH_3.C-NO_2$<br>$H_3C.OOC.CH_3$ | 1.20 | 1.4425 | 152-160 |
| Dimethylol nitroethane dipropionate | $H_3C.OOC.CH_2.CH_3$<br>$CH_3.C.NO_2$<br>$H_3C.OOC.CH_2.CH_3$ | 1.142 | 1.4420 | 150-165 |
| Dimethylol nitropropane diacetate | $H_3COOC.CH_3$<br>$CH_3.CH_2.C.NO_2$<br>$H_3COOC.CH_3$ | 1.152 | 1.4363 | 135-158 |
| Tri-alpha-ethylol nitromethane triacetate | $CH_3$<br>$CH_3.CHOOC.CH_3$<br>$CH_3.COOC-C-NO_2$<br>$CH-OOC.CH_3$<br>$CH_3$ | | 1.4467 | |

The products in accordance with this invention are soluble in aromatic hydrocarbons, alcohols, esters, and ketones. They are compatible with nitrocellulose of various types, as the ester-soluble, and the alcohol-soluble type, cellulose acetates of various acetic acid contents, as, 52%, 56%, etc., cellulose aceto-propionate, cellulose acetobutyrate, ethyl cellulose, chlorinated rubber, etc., and will be found to be valuable plasticizers in coating compositions and molding plastics of various types.

The products in accordance with this invention are particularly suitable for use either alone or in Plastics may be prepared from the above compositions by colloiding the composition, as, for example, with the aid of a mixture of equal parts alcohol and acetone on a differential two-roll mill. The plastic so produced may be sheeted and then molded into the desired form, and will be found to be tough, water-resistant, well bonded and of good clarity.

It will be understood that the details and examples hereinbefore set forth are illustrative only, and that the invention as herein broadly described and claimed is in no way limited thereby.

What I claim and desire to protect by Letters Patent is:

1. Trimethylol nitromethane tripropionate.
2. Trimethylol nitromethane tributyrate.
3. A method for the production of an ester of an aliphatic polyhydric nitro-alcohol selected from the group consisting of trimethylol nitromethane and dimethylol nitroethane which comprises reacting the said aliphatic polyhydric nitro-alcohol with a reagent from the group consisting of propionic acid, butyric acid, propionic anhydride, and butyric anhydride.
4. A method for the production of an ester of an aliphatic polyhydric nitro-alcohol selected from the group consisting of trimethylol nitromethane and dimethylol nitroethane which comprises reacting the said aliphatic polyhydric nitro-alcohol with a reagent from the group consisting of propionic acid, butyric acid, propionic anhydride, and butyric anhydride in the presence of an esterification catalyst.
5. A method for the production of an ester of an aliphatic polyhydric nitro-alcohol selected from the group consisting of trimethylol nitromethane and dimethylol nitroethane which comprises heating the said aliphatic polyhydric nitro-alcohol with a reagent from the group consisting of propionic acid, butyric acid, propionic anhydride, and butyric anhydride at a temperature not exceeding about 210° C.
6. A method for the production of an ester of an aliphatic polyhydric nitro-alcohol selected from the group consisting of trimethylol nitromethane and dimethylol nitroethane which comprises heating the said aliphatic aliphatic nitro-alcohol with a reagent from the group consisting of propionic acid, butyric acid, propionic anhydride, and butyric anhydride in the presence of an esterification catalyst at a temperature not exceeding about 210° C.
7. A method for the production of an ester of an aliphatic polyhydric nitro-alcohol selected from the group consisting of trimethylol nitromethane and dimethylol nitroethane which comprises heating the said aliphatic polyhydric nitro-alcohol with a reagent from the group consisting of propionic acid, butyric acid, propionic anhydride, and butyric anhydride at a temperature within the range of about 100° C. to about 150° C.
8. A method for the production of an ester of an aliphatic polyhydric nitro-alcohol selected from the group consisting of trimethylol nitromethane and dimethylol nitroethane which comprises heating the said aliphatic polyhydric nitro-alcohol with a reagent from the group consisting of propionic acid, butyric acid, propionic anhydride, and butyric anhydride in the presence of an esterification catalyst at a temperature within the range of about 100° C. to about 150° C.
9. An ester of a lower fatty acid selected from the group consisting of propionic acid and butyric acid with an aliphatic polyhydric nitro-alcohol selected from the group consisting of trimethylol nitromethane and dimethylol nitroethane.
10. An ester of propionic acid with an aliphatic polyhydric nitro-alcohol selected from the group consisting of trimethylol nitromethane and dimethylol nitroethane.
11. An ester of butyric acid with an aliphatic polyhydric nitro-alcohol selected from the group consisting of trimethylol nitromethane and dimethylol nitroethane.

WALTER E. GLOOR.